(12) United States Patent
Rhoads et al.

(10) Patent No.: US 7,041,372 B2
(45) Date of Patent: May 9, 2006

(54) ANTI-BALLISTIC NANOTUBE STRUCTURES

(75) Inventors: James E. Rhoads, Belcamp, MD (US);
Frederick J. Herman, Fort Worth, TX (US); John O. Yanaros, Jr., Fort Worth, TX (US); David S. Henn, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 375 days.

(21) Appl. No.: 09/956,304

(22) Filed: Sep. 19, 2001

(65) Prior Publication Data

US 2005/0158551 A1    Jul. 21, 2005

(51) Int. Cl.
*B23B 9/00*        (2006.01)
(52) U.S. Cl. ...................... 428/408; 428/913
(58) Field of Classification Search ............... 428/408, 428/913
See application file for complete search history.

(56) References Cited

U.S. PATENT DOCUMENTS

| | | | |
|---|---|---|---|
| 4,100,322 A * | 7/1978 | Seibold et al. | |
| 4,922,827 A * | 5/1990 | Remo | |
| 5,154,965 A * | 10/1992 | Rouhling | |
| 5,424,054 A * | 6/1995 | Bethune et al. | |
| 6,265,466 B1 * | 7/2001 | Glatkowski et al. | |

FOREIGN PATENT DOCUMENTS

WO    PCT/US00/29722    10/2000

* cited by examiner

*Primary Examiner*—Archene Turner
(74) *Attorney, Agent, or Firm*—Koestner Bertani, LLP

(57)                ABSTRACT

A structure arrangement and method for the protection of a host system against an impacting ballistic element and for providing ease of mobility. The structure arrangement includes a composite. The composite includes a matrix and a multiplicity of single-walled carbon nanotubes. The single-walled carbon nanotubes are arranged with respect to the matrix so as to define an array for engagement with an impacting ballistic element.

20 Claims, 20 Drawing Sheets

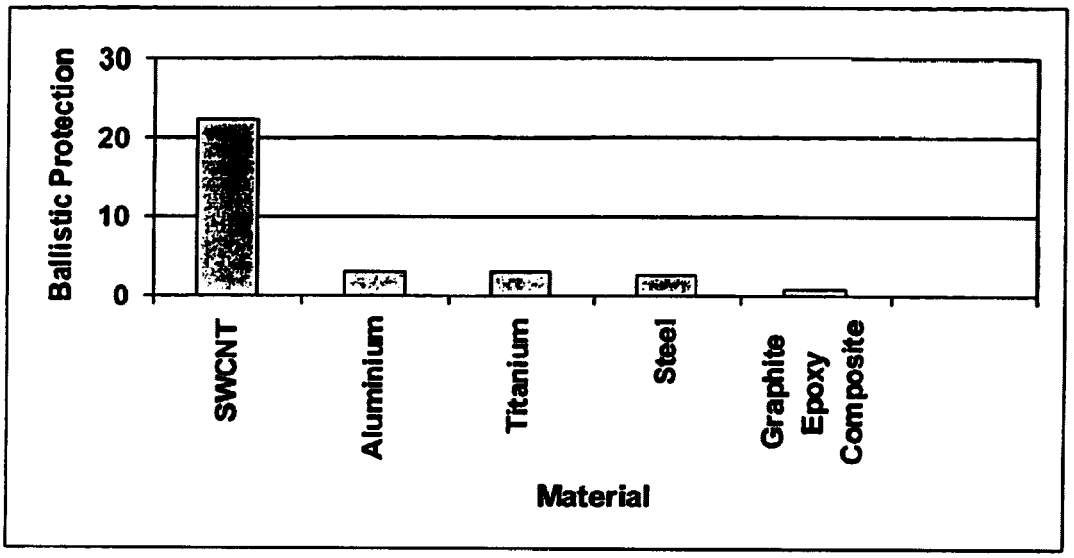

Figure 20

| Projectile Element: Size and Velocity | Minimum Thickness: SWCNT[3] | Minimum Thickness: Aluminum Alloy[5] | Minimum Thickness: Titanium | Minimum Thickness: Steel | Minimum Thickness: Gr-Ep Composite[4] |
|---|---|---|---|---|---|
| 60 grain @ 6000 feet per second | .20 - .33 | 1.0 | 0.6 | 0.4 | 5.3 |
| 23 mm Armor Piercing Incendiary @ 2500 feet per second | .7 - 1.16 | 3.0 | 1.6 | 1.4 | 7.5 |
| 30 mm Armor Piercing Incendiary @ 2500 feet per second | .85 - 1.42 | 3.7 | 2.0 | 1.7 | 8.1 |

1. All units in inches.
2. Minimum thickness assumed to be where threat cannot perforate the plate 100% of the time.
3. Error band of thickness is +/- 20%
4. Gr-Ep is a typical graphite-epoxy composite (IM-7/977-3).
5. AL 2024 Alloy

Figure 21

ANTI-BALLISTIC NANOTUBE STRUCTURES

BACKGROUND OF THE INVENTION

I. Field of the Invention

The present invention generally relates to material structures that include ductile, lightweight, high fatigue strength and high fracture strength characteristics. More particularly, this invention relates to a system and method for providing ease of mobility and protecting a host against an impacting ballistic element.

II. Detailed Description of the Prior Art

Many typical examples of systems, such as airplanes, spacecraft, cars, tanks, boats, buildings and personnel are subjected to ballistic impact by projectiles. For example, among others, a ballistic element includes a bullet directed at personnel, an artillery shell impacting a tank, a missile fired at a ship, a high speed particle hitting a satellite, and flying debris impacting an automobile or window. Impacts by ballistic elements often result in catastrophic or terminal damage to these systems. To mitigate or prevent impact damage, structural systems are often armored with laminates, i.e. protective layers of material deposited on the system, or are structurally composed of an anti-ballistic material.

Unfortunately, armored systems are often heavy and slow moving in that the mass density of armor typically increases with increasing ballistic protection. Thus, there exists an increased risk of detrimentally compromising the overall performance of a system as more armor is added to the system. For example, to adequately protect military aircraft from potential ballistic threats, weight from added armor protection could prevent an aircraft from maneuvering, mobilizing over long distances, or even limit the performance of basic flight operations such as taking off and landing for example. In another example, to protect a satellite system from impacts from celestial projectile particles, satellite components are often plated with armor but any increased weight from the armor would dramatically increase the cost for delivering that satellite payload into space.

All of these existing types of armor suffer from the inability to provide a lightweight material having high fatigue and fracture strength. Many typical examples that provide protection against ballistic elements include either a thick and heavy armor-type or a lighter armor type that provides easy mobility but with less ability to sustain a ballistic impact than heavy armor. Heavy armor types typically provide greater fatigue and fracture strength whereas lightweight composites provide greater mobility while often compromising fracture and fatigue strength.

Illustratively, tanks, ships, and armored personnel vehicles typically include armor often having metallic or other high density components that render such devices as bulky, heavy, and slow moving. However, to provide greater requisite mobility, lightweight armor often includes composite materials that are brittle and sacrifice the fatigue and fracture strength provided by heavy armor. Some examples of lightweight armor include protective material for aerospace applications and for personnel such as bulletproof vests and helmets.

For example, a typical tank includes heavy, bulky armor for sustaining engagement with a wide range of ballistic elements in combat. However, the weight associated with the armor often makes the tank difficult to move. For example, a tank may encounter difficulty during military maneuvers or as the tank is mobilized to the theatre front. For one specific example, a US-made M1 Abrahams tank, although ideal for sustaining projectiles at high speeds, incorporates a uranium-based armor. During mobilization to the theatre front, this armor prohibits the M1 tank from transport through ideal avenues of air and truck transport exclusively to the slower options of by ship or rail due to the extreme weight of the uranium armored tank. On the other hand, lightweight armor provides for ease of movement but often compromises the ability to sustain a greater range of projectile sizes and/or projectile speeds as that of heavier armor. Armored aircraft, such as for example tactical or strategic aircraft, require lightweight armor for optimal maneuverability through the air. For tactical aircraft, graphite-epoxy composites provide lightweight armored protection against a narrow range of projectile sizes and/or speeds.

In short, existing types of armor do not provide for the aspects of lightweight as well as high fatigue and fracture strength. Many other problems and disadvantages of the prior art will become apparent to one skilled in the art after comparing such prior art with the present invention as described herein.

SUMMARY OF THE INVENTION

For the present invention, the aspect of including single-walled carbon nanotubes into an armored system provides for lightweight protection that also includes high fatigue and fracture strength characteristics capable of sustaining an optimal range of impacts from ballistic elements. For example, carbon nanotubes offer a high elastic modulus and a high strain to failure of a ductile material. Single-walled carbon nanotubes are a type of carbon nanotube. Carbon nanotubes typically are a hollow, tubular type of fullerene structure. Fullerenes, including the popular Buckeyball, are one of the three common allotropes of carbon that also include diamonds, and graphite.

Carbon nanotubes consist of two-dimensional hexagonal sheets folded together and often capped at both ends by a fullerene cap. Because of its tubular shape, a carbon nanotube extends outwardly to form a strand having a length that is millions of times greater than its diameter.

Aspects of the invention are found in a structure arrangement and method for the protection of a host against an impacting ballistic element and for providing ease of mobility. In one exemplary embodiment, the structure arrangement includes a composite disposed on a substrate and a substrate coupled to the host. As such, the structure arrangement is directed toward a laminate for application with a host. In yet another exemplary embodiment, the structure arrangement is directed to a predetermined component or structure formed by single-walled carbon nanotubes so that the structure is ultimately incorporated with a host. It should be added that the host may be any suitable system and personnel for receiving ballistic protection and increased mobility due to the strong, lightweight characteristics of single-walled carbon nanotubes.

In one aspect, the structure arrangement includes a composite. The composite includes a matrix and a multiplicity of single-walled carbon nanotubes. The single-walled carbon nanotubes are arranged with respect to the matrix so as to define a protection array for engagement with a ballistic element.

In one exemplary embodiment, the array is defined by a multiplicity of single-walled carbon nanotubes positioned between the interstices of the matrix. In another exemplary embodiment the array is defined by the multiplicity of single-walled carbon nanotubes arranged along a plane or, alternatively, along a plurality of planes with respect to the matrix.

It should also be added that in another aspect, the array is defined by predetermined size configuration with respect to a matrix. In another aspect, the array is defined in a predetermined shape configuration with respect to the matrix.

In another aspect of the invention, a method for protection against an impacting ballistic element includes arranging single-walled carbon nanotubes with respect to the matrix to thus define a protection array. Ultimately, the protection array is incorporated with a host. As such, the host moves with respect to the ballistic device and engages with the ballistic device.

In yet another aspect, the method includes a procedure for producing carbon nanotubes in situ with respect to the matrix. Moreover, the method includes a process for producing carbon nanotubes ex situ with respect to the matrix.

Other aspects, advantages, and novel features of the present invention will become apparent from the detailed description of the invention when considered in conjunction with the accompanying drawings.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The present invention is illustrated by way of example and not limitation in the accompanying figures, in which like references indicate similar elements, and in which:

FIG. 20 shows a comparison of specific ballistic protection provided by an array of single-walled carbon nanotubes with other materials.

FIG. 21 shows the range of thickness required for various ballistic protection materials to sustain an impact from three exemplary projectile element sizes and speeds.

DETAILED DESCRIPTION OF THE PREFERRED EMBODIMENT

Figure 1:
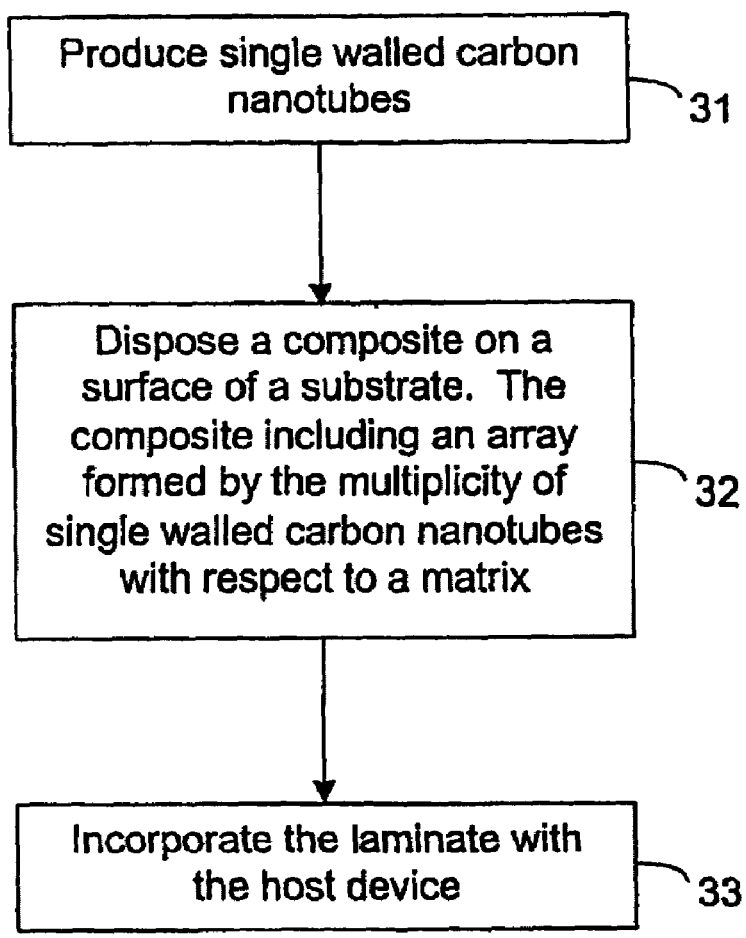
FIG. 1 is a flow diagram of a method for protection against an impacting ballistic element according to the invention.

As required, detailed embodiments of the present invention are disclosed herein, however, it is to be understood that the disclosed embodiments are merely exemplary of the invention, which may be embodied in various forms. FIG. 1 is a schematic diagram of a method 30 for protection against an impacting ballistic element and for providing ease of mobility in an exemplary aspect of the invention. In particular, the method 30 produces a composite laminate that includes a multiplicity of single-walled carbon nanotubes for integration with a host device.

For the method 30 of FIG. 1, single-walled carbon nanotubes are produced via step 31. In one exemplary embodiment, single-walled carbon nanotubes are produced by electric-arc discharge procedures. In another exemplary embodiment single-walled carbon nanotubes are produced by methods of resistive heating. And in yet another exemplary embodiment, single-walled carbon nanotubes are produced by laser ablation processes. It should also be stated that, the term mobility in the disclosure and appended claims refers to the ability to provide a desired range of motion.

With reference to producing single-walled carbon nanotubes as associated with step 31, it should also be noted that in this disclosure and appended claims, "ex situ" production refers to production of single-walled carbon nanotubes as a separate process from the formation of the composite containing single-walled carbon nanotubes. On the other hand, "in situ" production in this specification and related claims refer to the production of single-walled carbon nanotubes during the process of forming the composite.

The method 30 advances from step 31 to step 32. In step 32, a composite including single-walled carbon nanotubes is formed and disposed on a substrate. The composite includes a matrix and a multiplicity of single-walled carbon nanotubes.

In this disclosure and appended claims the term "matrix" refers to any binding agent. As such, the at least one any binding agent may or may not exhibit various structural characteristics. Moreover, the at least one any binding agent may or may not exhibit various material characteristics, such as for example, among others, electrical, thermal, electromagnetic, and mechanical characteristics. As those of ordinary skill in the art may readily recognize, the binding agent may comprise any molecular combination for accommodating single-walled carbon nanotubes.

In one exemplary embodiment, the matrix comprises at least one binding agent that exhibits an internal structure. In one exemplary embodiment, the matrix comprises at least one binding agent that does not exhibit an internal structure. In one exemplary embodiment, the matrix comprises a plurality of binding agents. In one exemplary embodiment, the structure arrangement includes a plurality of matrices. In one exemplary embodiment, the structure arrangement includes a plurality of matrices used in conjunction with one another.

In one exemplary embodiment, the matrix includes metals such as for example, iron, nickel, and cobalt. In another exemplary embodiment, the matrix includes a combination of ceramic material for accommodating single-walled carbon nanotubes. In yet another embodiment the matrix may include polymer materials for accommodating single-walled carbon nanotubes.

The multiplicity of single-walled carbon nanotubes are arranged with respect to the matrix so as to define an array. Accordingly, the array of single-walled carbon nanotubes is configured for optimal engagement with a ballistic element.

Moreover, in step 32 the composite including the multiplicity of single-walled carbon nanotubes is disposed on the substrate. As such, the laminate is formed in step 32.

In step 33, the laminate is incorporated with the host. In one embodiment, the host may include a system such as for example aircraft, ground vehicles, and ships, for the protection against an impacting projectile. In another exemplary embodiment, the host refers to personnel that require protection against an impacting ballistic element. As such, examples of impacting ballistic elements include a bullet, a sports-related projectile such as a ball or a hockey puck and construction equipment.

Figure 2:
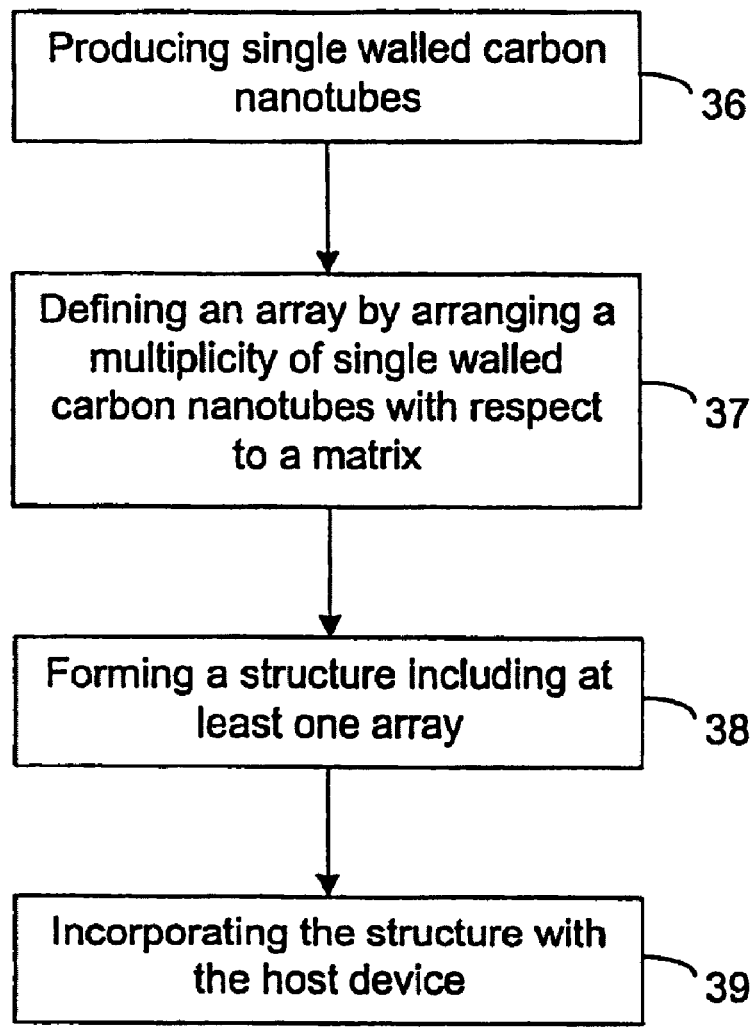
FIG. 2 is a flow diagram of another method for protection against an impacting ballistic element according to the invention.

FIG. 2 is a flow diagram of another embodiment of a method 35 for protection against an impacting ballistic element and for providing ease of mobility. In step 36, a multiplicity of single-walled carbon nanotubes are produced for combination with a matrix. Those of ordinary skill in the art will readily recognize methods for producing single-walled carbon nanotubes such as for example procedures associated with electric-arc discharge, resistive heating, and laser ablation.

As shown in step 37 of FIG. 2, an array is defined by arranging a multiplicity of single-walled carbon nanotubes with respect to the matrix. In operation, the array engagedly receives a ballistic element. In effect, the array provides high material strength and strain properties sufficient enough to withstand impact similar to or often better than that of current armor materials that exhibit high density as well as fatigue and fracture strength and strain characteristics. An array of carbon nanotubes features a high elastic modulus and a high strain to failure of a ductile material. The array, however, produces an overall composite with far less density than existing armor materials.

A comparison of specific ballistic protection provided by an array of single-walled carbon nonotubes with other materialsused as aromor is shown in FIG. 20. Accordingly, for example, single-walled carbon nanotubes provide ballistic protection ratio twenty times greater than that of graphite epoxy armor typically used by aerospace vehicles. In this disclosure and related claims, a ballistic protection ratio refers to the minimum thickness required for protection with respect to the density of the material.

As a further illustration, FIG. 21 shows the range of thicknesses required for various ballistic protection materials to sustain an impact from three exemplary projectile element sizes and speeds. Accordingly, an array of single-walled carbon nanotubes features a relatively smaller range of thickness required to sustain the same exemplary projectiles as that of thicker and thus heavier armored counterpart materials.

It should also be added, that in one exemplary embodiment the array is defined by a pre-determined size configuration with respect to the matrix. As such, the array of single-walled carbon nanotubes includes a thickness defined according to a predetermined range. In another exemplary embodiment, the array of single-walled carbon nanotubes includes a configuration according to a predetermined area. In yet another embodiment, the array of single-walled carbon nanotubes includes a configuration according to a predetermined volume metric arrangement with respect to the matrix.

Similarly, the array is further defined by a predetermined shape configuration with respect to the matrix. In one embodiment, as outlined in detail below, the array of single-walled carbon nanotubes is interspersed between the interstices defining the matrix. In yet another exemplary embodiment the array is configured as a net-like or mesh net shape. In another embodiment, the array includes a predefined volume metric shape within the matrix. In another exemplary embodiment the array is defined by a multiplicity of single-walled carbon nanotubes arranged along a plane or, alternatively, a plurality of planes with respect to the matrix.

Figure 15:
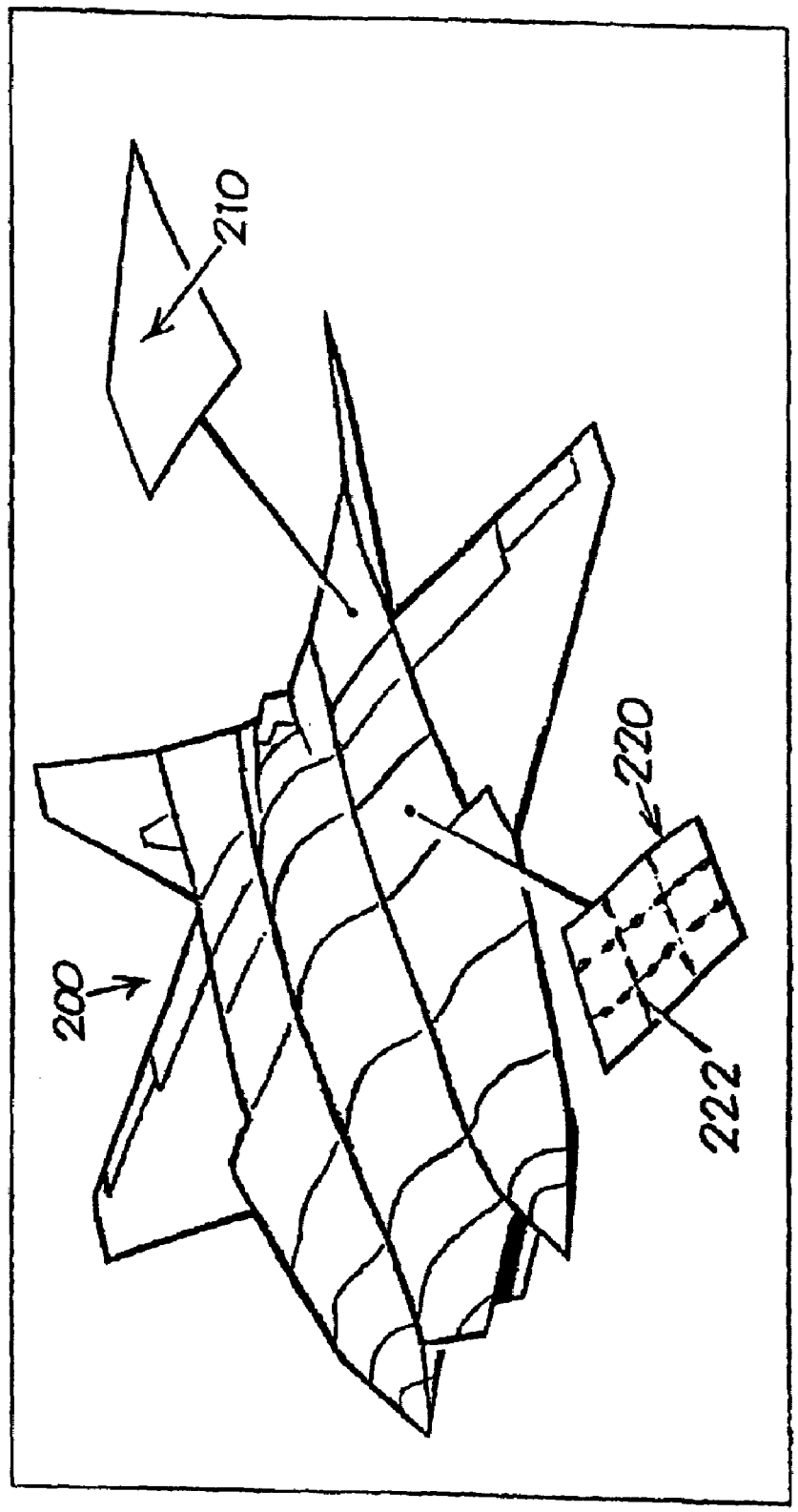
FIG. 15 is a schematic diagram detailing some aspects of incorporating an array of single-walled carbon nanotubes with a host, such as an aerospace vehicle for example.

In continuing with the method 35 of FIG. 2, a structure is formed to include at least one array in step 38. In one exemplary embodiment, the structure is created according to a predetermined shape. For example, as shown in FIG. 15, the structure is configured to resemble a body panel for a tactical aerospace vehicle. In another exemplary embodiment, the structure is configured to a predetermined size. For example, as shown if FIG. 16, the structure 310 is configured to be received by a ground vehicle and to accommodate a window. Accordingly, once it is formed, the structure in step 39 is incorporated with a host device.

In one exemplary embodiment, a laminate material including at least one array of carbon nanotubes form body panels for use with a ground vehicle, such as for example a military vehicle, a general automotive vehicle, and a motor sport vehicle. For this exemplary embodiment, the laminate material body panels stiffen the overall structure of the automotive body. The stiff body panels are configured to absorb impact energy and encountered by a ground vehicle and thus relieving the vehicles frame from fully absorbing those impact energies.

Figure 16:
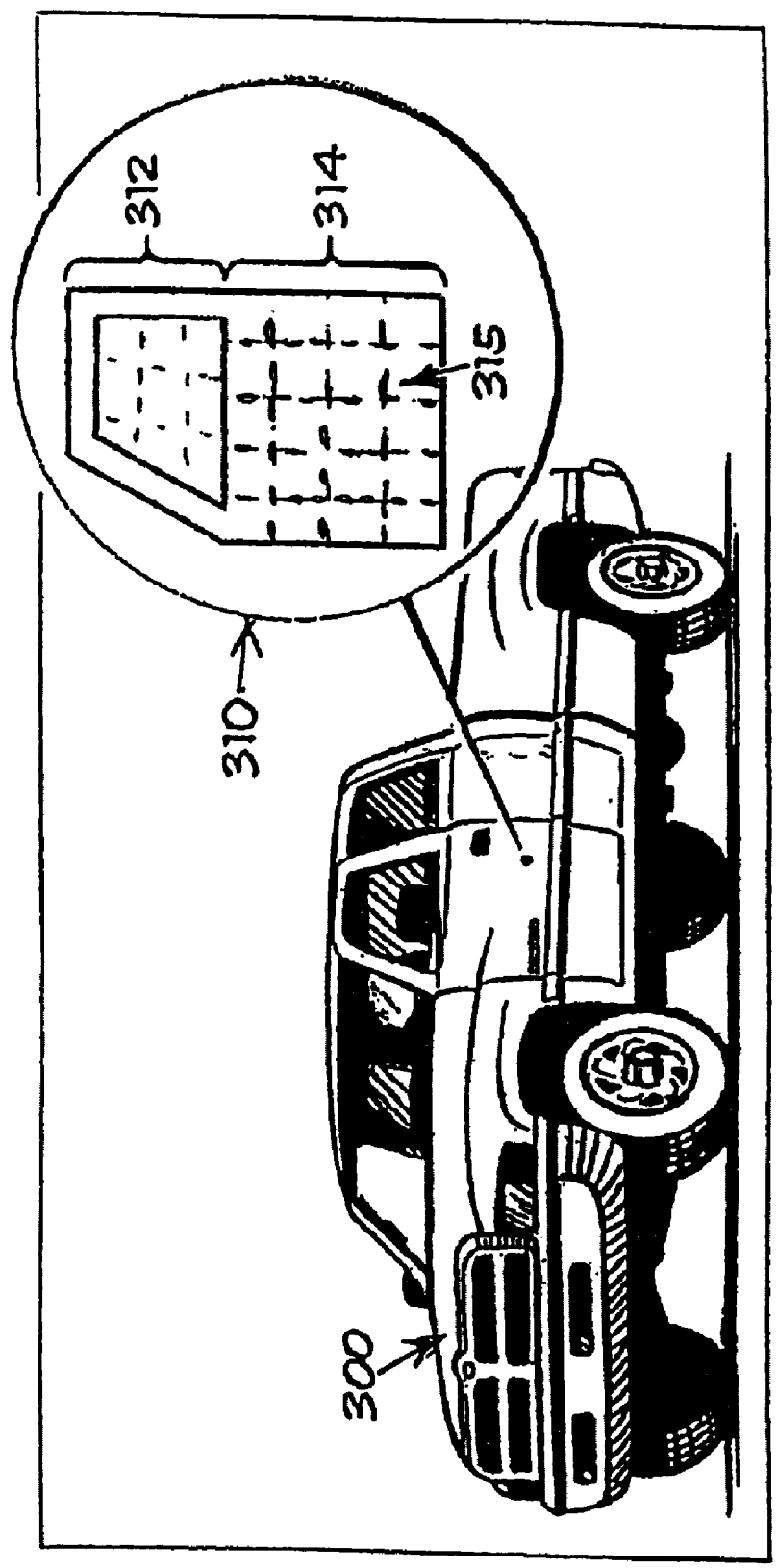
FIG. 16 is a schematic diagram detailing some aspects of incorporating an array of single-walled carbon nanotubes with a host, such as a ground vehicle.

In one embodiment, as shown in FIG. 16, a composite laminate 322 having an array of single-walled carbon nanotubes are applied to a host. The composite laminate 322 is shaped according to the appropriate location of the vehicle 300. In one exemplary embodiment, the frame of a motor vehicle, including an automobile, a car, or a ship, includes at least one array of single-walled carbon nanotubes.

In one exemplary embodiment, a transparent or translucent composite laminate 323 including at least one array of single-walled carbon nanotubes to thus define a window. Those of ordinary skill in the art will readily recognize the application of windows including at least one array of carbon nanotubes, such as for example buildings and vehicles. Illustratively, among others, a ground vehicle, such as an assault vehicle, a police vehicle, includes a combination of body panels and windows defined by at least one array of single-walled carbon nanotubes.

As a further illustration, automotive and motor sports applications require lightweight structure as well as strength to absorb impact energy from flying debris as well as from other vehicles. As such, an automotive and motor sport vehicle may include structural and laminate composites formed by at least one array of single-walled carbon nanotubes.

Figure 3:
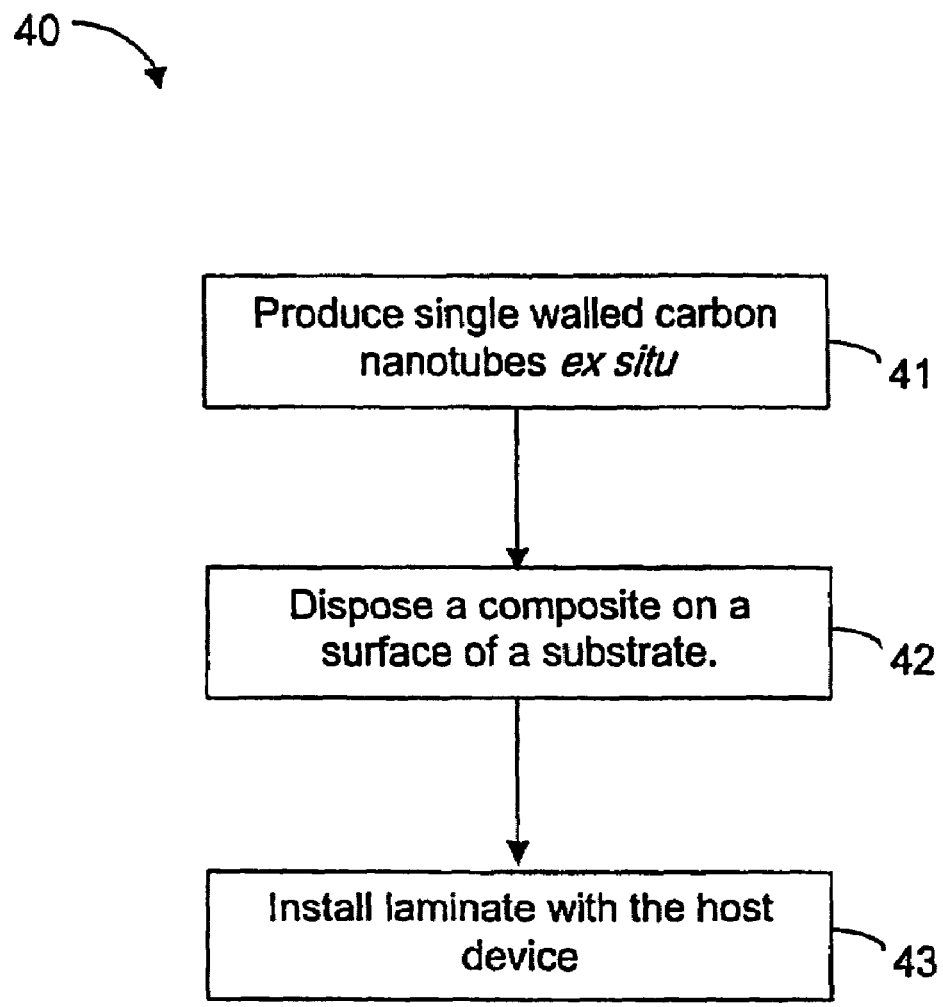
FIG. 3 is a flow diagram of another method for the protection against an impacting ballistic element.

For the embodiment of FIG. 3, the method 40 for protection against an impacting ballistic element and for providing ease of mobility is similar to the method 30 of FIG. 1 but includes the aspect of producing single-walled carbon nanotubes ex situ from the production of a composite containing single-walled carbon nanotubes. In step 41, single-walled carbon nanotubes are produced ex situ according to manufacturing processes of the type well known in the industry.

Those of ordinary skill in the art will readily recognize that the size and shape of single-walled carbon nanotubes vary in accordance with the required application. For example, small fragments of single-walled carbon nanotubes are required for insertion between the interstices of a matrix defining a desired composite. In another example, single-walled carbon nanotubes are produced to form an elongated shape.

In step 42, a composite is disposed on the surface of a substrate. The composite includes an array formed by the multiplicity of single-walled carbon nanotubes with respect to the matrix. In step 43, the laminate that includes the composite disposed on the surface of a substrate is installed with the host device.

Figure 4:
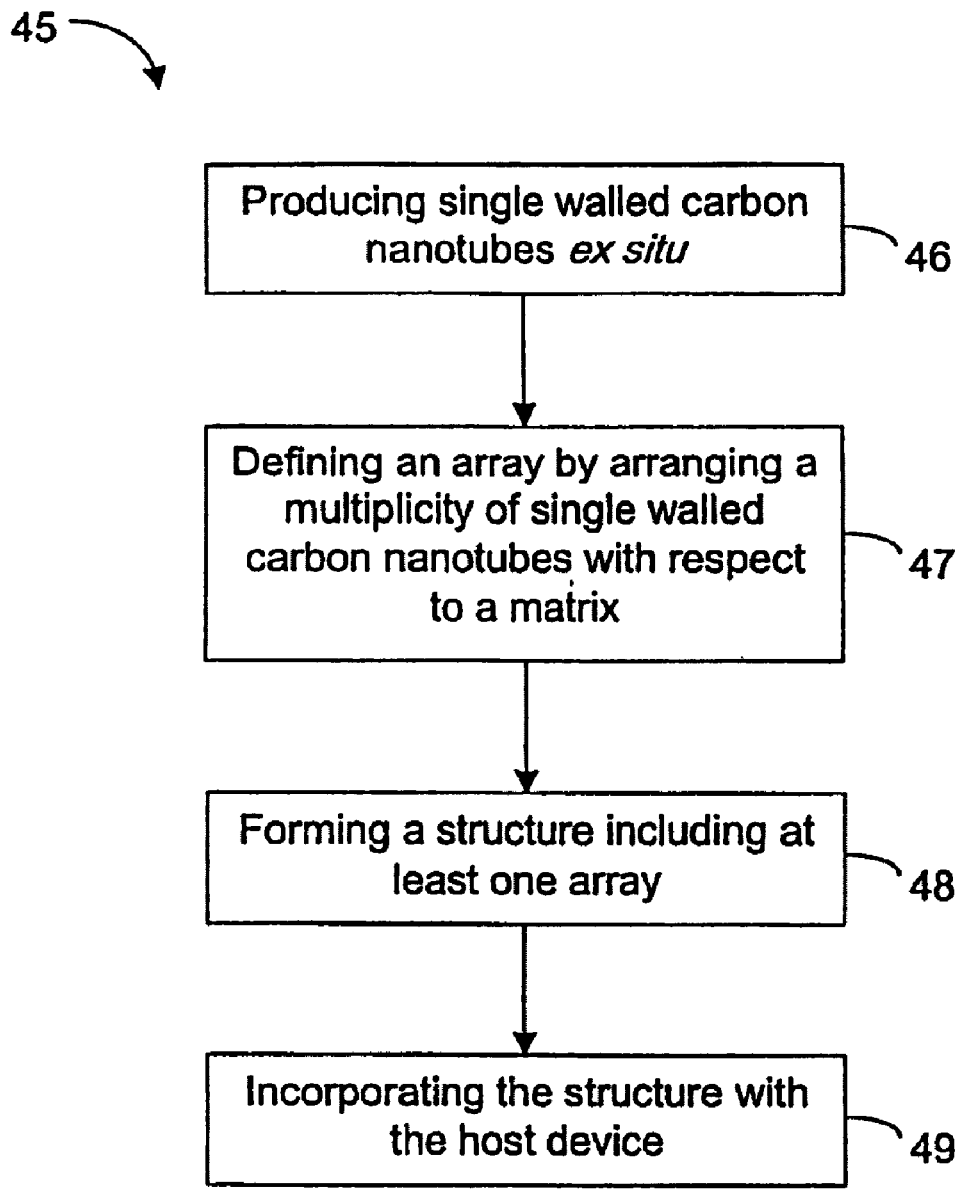
FIG. 4 is a flow diagram of another method for the protection against an impacting ballistic element.

For the embodiment of FIG. 4, a method for protection against an impacting projectile and for providing ease of mobility is shown. For example, for supplying maneuverability, for providing rapid mobilization, and for providing a lightweight composite for movement in a desired range of motion. The method 45 is similar to that of the method 35 of FIG. 2 including the aspect of producing single-walled carbon nanotubes ex situ.

As such, in step 46, single-walled carbon nanotubes are produced ex situ from that of composite production. In step 47, a multiplicity of single-walled carbon nanotubes are arranged with respect to a matrix to thus define an array.

For step 48, a structure is formed to include at least one array. Those of ordinary skill in the art will readily recognize that the structure may be formed by introducing the at least one array into a template or, alternatively, the structure may be formed according to well established post-production composite processing methods, including for example machining the composite so as to define a structure. In step 49, the structure is installed within the host device.

Figure 5:
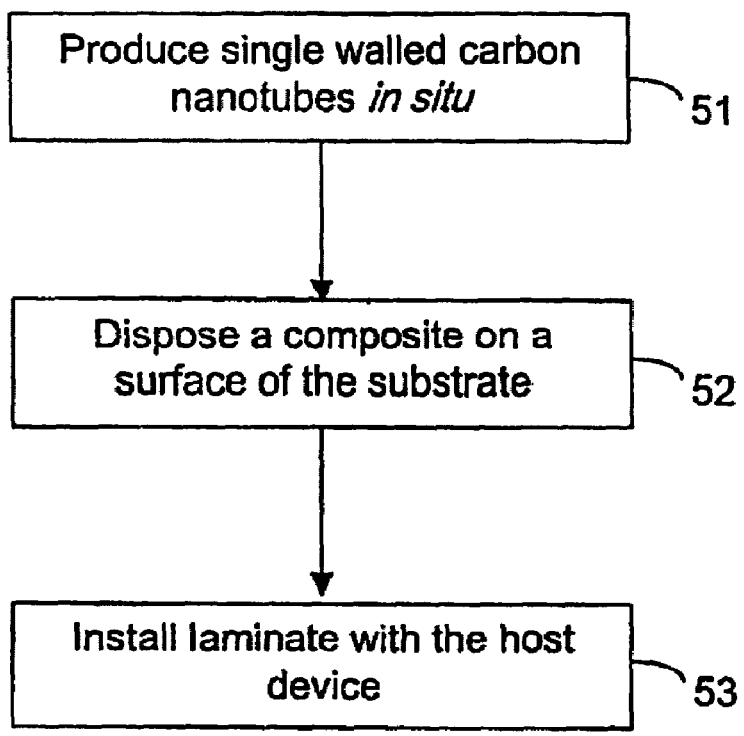
FIG. 5 is a flow diagram of another method for the protection against an impacting ballistic element.

For the embodiment of FIG. 5, a method for protection against an impacting ballistic element and for providing ease of mobility 50 is shown. The method 50 is similar to the method 30 of FIG. 1 and includes the aspect of producing a laminate having an array formed of single-walled carbon nanotubes in situ.

Figure 10:
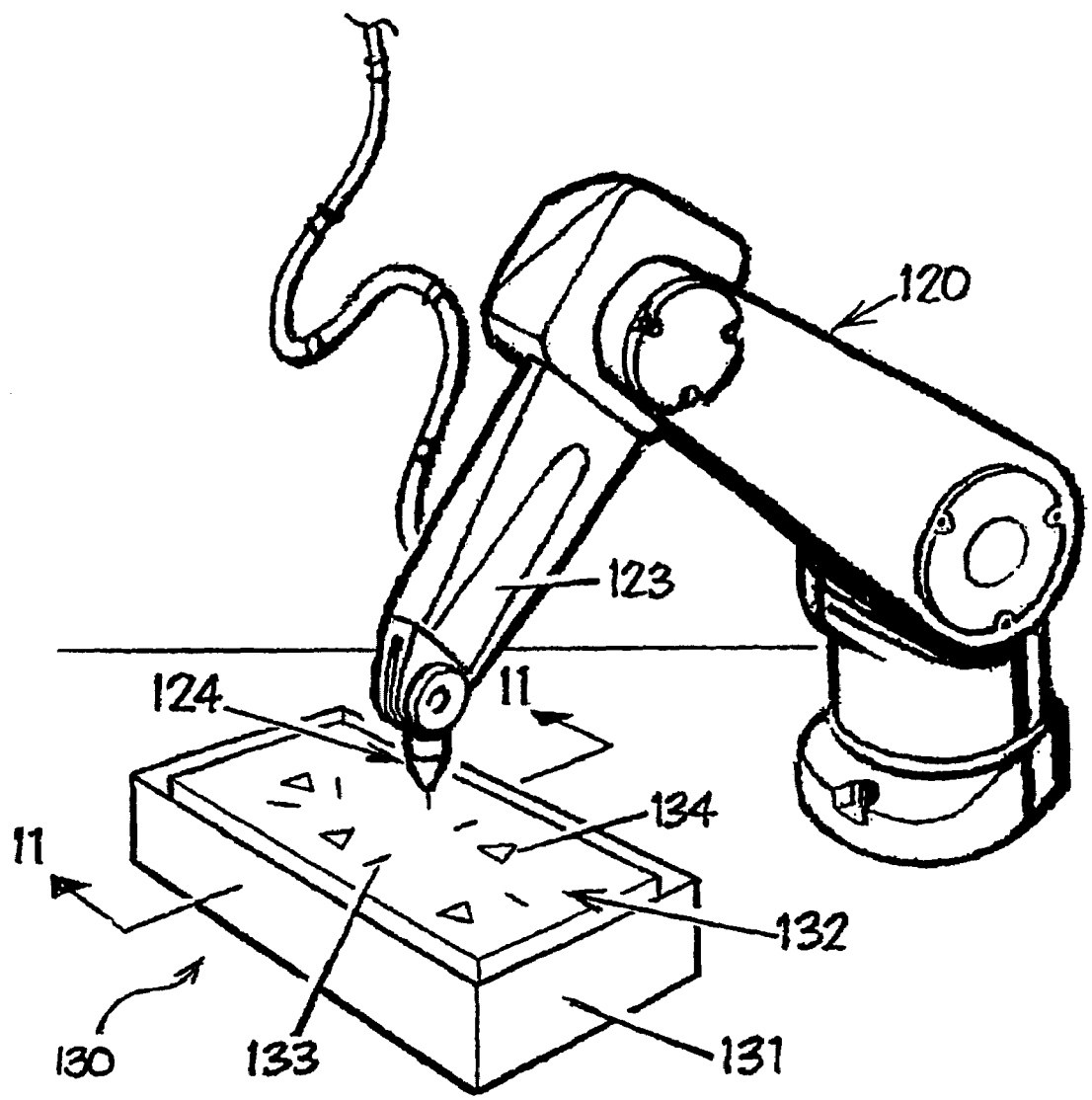
FIG. 10 is a schematic diagram detailing some aspects of arranging single-walled carbon nanotubes with respect to a composite.

Thus, in step 51, single-walled carbon nanotubes are produced in situ. As discussed in greater detail below, FIG. 10 illustrates one exemplary embodiment for in situ production. In step 52, a composite including an array formed by the multiplicity of single-walled carbon nanotubes is disposed on the surface of a substrate. In step 53, a laminate formed by the composite on the surface of a substrate is installed with a host device.

Figure 6:
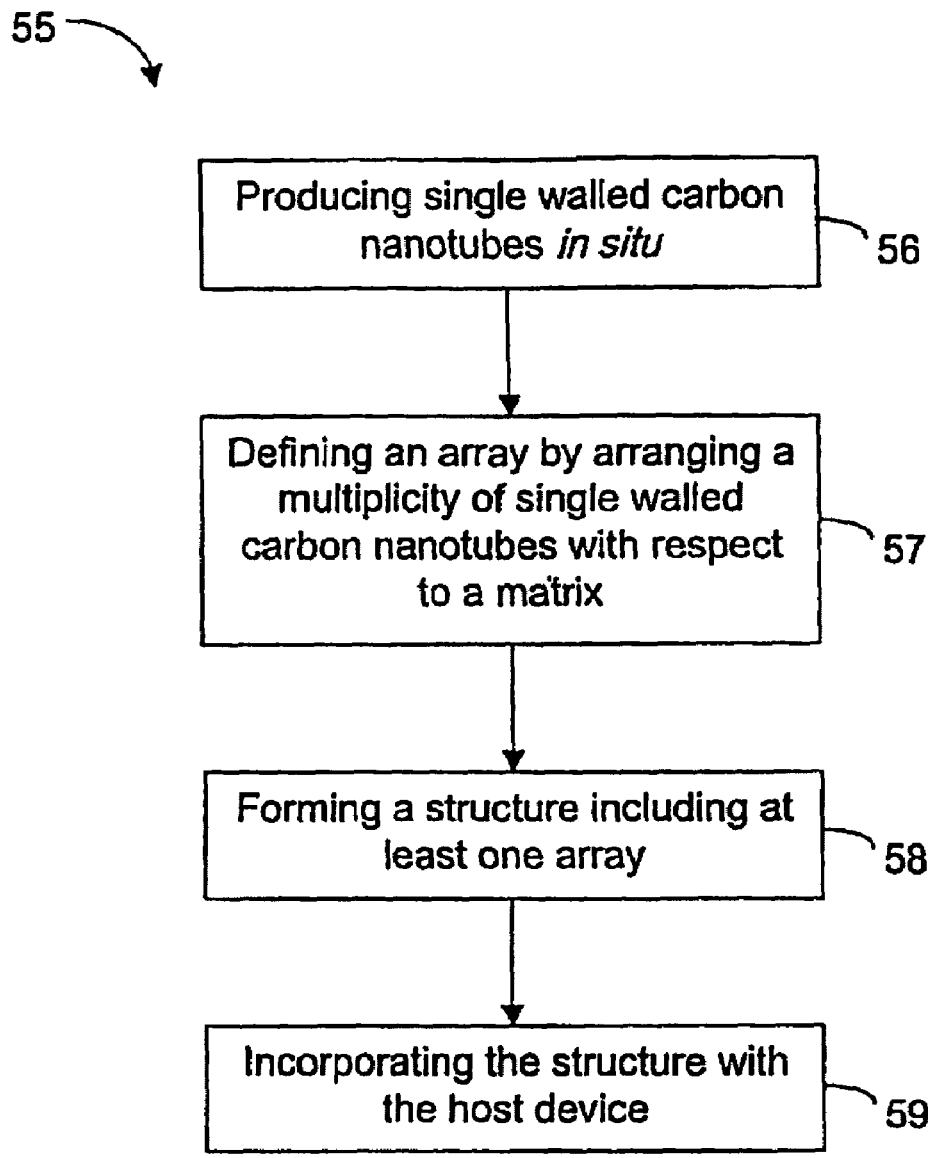
FIG. 6 is a flow diagram of another method for the protection against an impacting ballistic element.

For the embodiment of FIG. 6, a method 55 for protection against an impacting ballistic projectile and for producing ease of mobility is shown. The method 55 is similar to the method 35 of FIG. 2 and features the aspect of producing at least one structure having an array formed of single-walled carbon nanotubes in situ according to step 56. In step 57, a multiplicity of single-walled carbon nanotubes are arranged with respect to a matrix to define an array. A structure including at least one array is formed in step 58. In step 59, the structure is incorporated with a host device.

Figure 7:
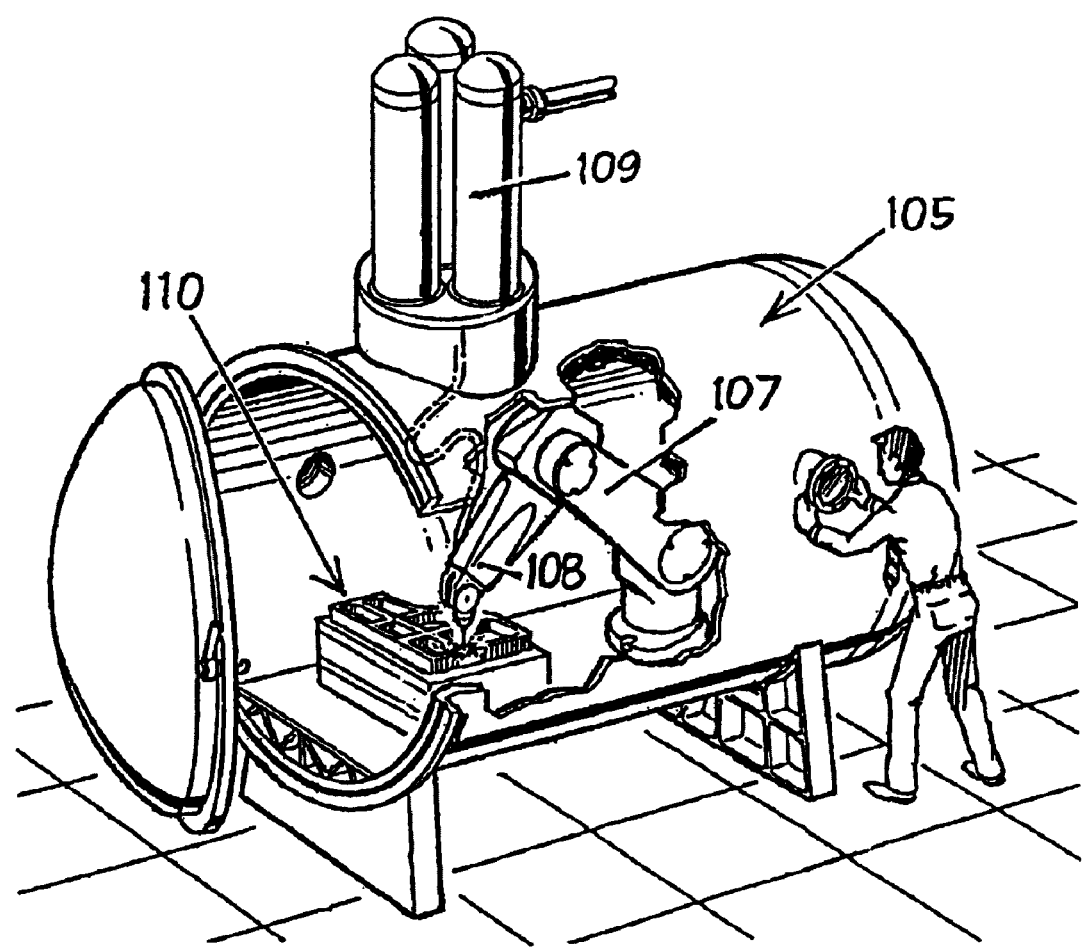
FIG. 7 is a flow diagram of a schematic diagram detailing some aspects of arranging single-walled carbon nanotubes with respect to a composite.

FIG. 7 shows one exemplary embodiment for the production of a composite 110 including at least one array. A system 100 arranges the array with respect to a matrix included by the composite 110. For the system 100 of FIG. 7, the composite 110 is formed within a controlled environment 105.

In particular, a device 107, such as for example a lasing system, is used to form the composite 110. The device 107 includes a formation element 108. The formation element 108 generates a composite that includes the at least one array. The formation element 108 arranges single-walled carbon nanotubes with respect to the matrix so as to define the at least one array for engagement with the ballistic device.

Illustratively, for example, the device 107 may comprise an industrial laser of a type well known in the industry. The industrial laser is coupled to a support assembly 109 for facilitating the generation of laser energy within the controlled environment 105. Illustratively, in operation, the array is formed by subjecting the composite 110 to laser energies from the device according to established procedures of a type well known in the industry such as laser ablation or electric arc discharge for example.

Figure 8:
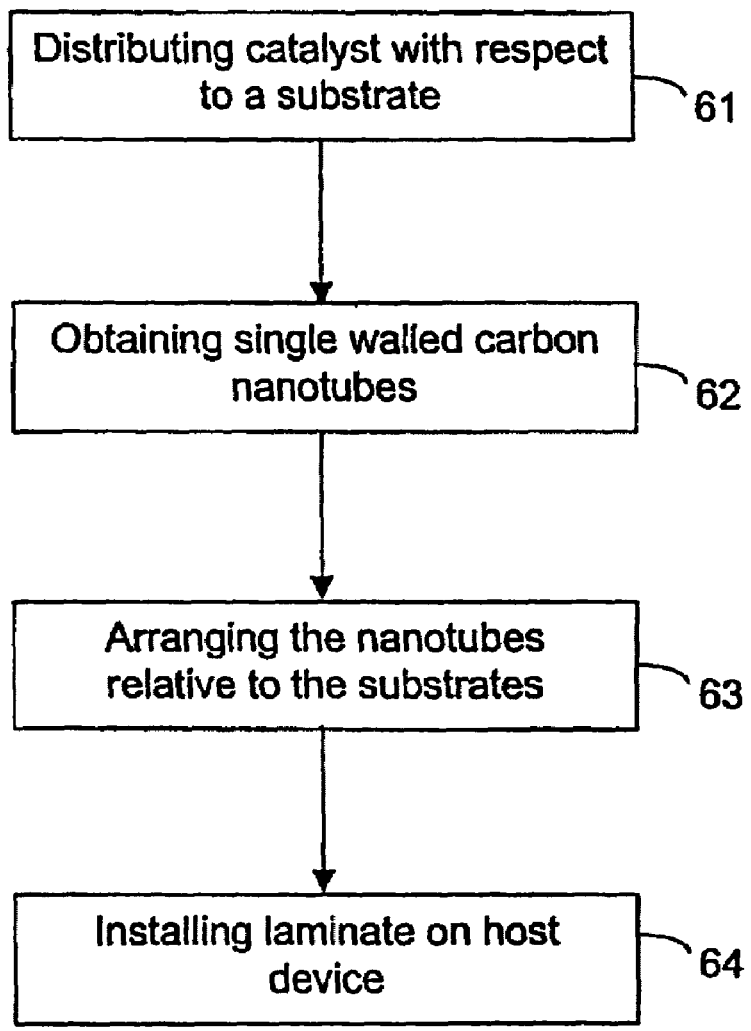
FIG. 8 is a flow diagram of another method for protection against an impacting ballistic element.

For the exemplary embodiment of FIG. 8, a method 60 for protection against an impacting ballistic element and for providing ease of mobility is shown. The method 60 provides a laminate composite that includes an array defined by a multiplicity of single-walled carbon nanotubes.

In step 61, at least one catalyst particle is deposited on a substrate. The catalyst particles induce the generation of material aspects required for the formation of the laminate composite. Illustratively for example, the catalyst particle may include for example iron, nickel, and cobalt.

In step 62, single-walled carbon nanotubes are obtained for the formation of an array. Illustratively, for example, single-walled carbon nanotubes feedstock can be discharged from a supply unit to the substrate containing at least one catalyst particle. The single-walled carbon nanotubes feedstock is typically produced ex situ from the composite. Alternatively, in another example, single-walled carbon nanotubes may be formed in situ with respect to the laminate composite.

In step 63, the nanotubes are arranged relative to the substrate so as to define at least one array for engagement with a projectile. The laminate composite in step 64 is incorporated with the host device.

Figure 9:
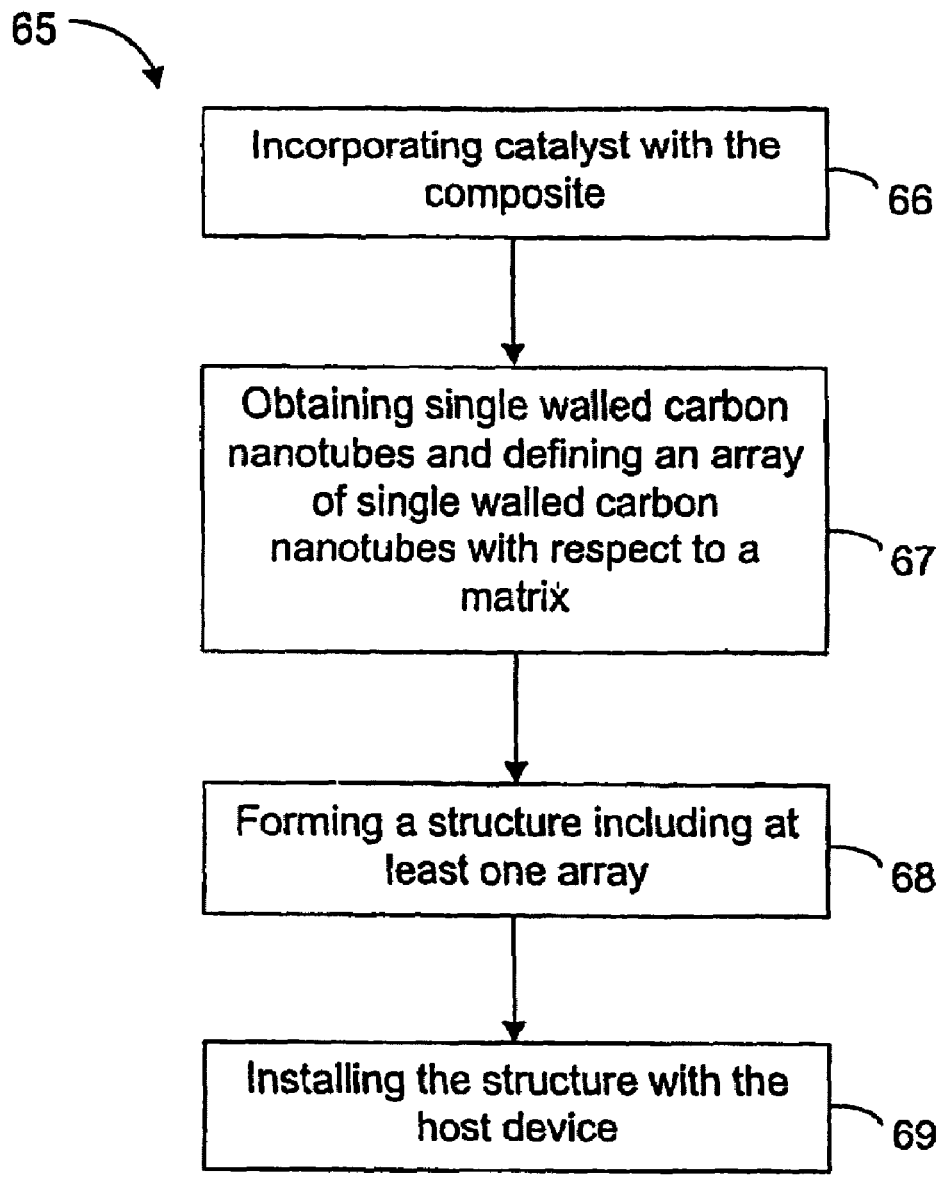
FIG. 9 is a flow diagram of another method for protection against an impacting ballistic element.

For the exemplary embodiment of FIG. 9, a method 65 for protection against an impacting projectile and for facilitating ease of mobility is shown. In step 66, at least one catalyst is incorporated with a composite. In step 67, single-walled carbon nanotubes are obtained according to methods of a type well known in the industry. Such as for example, obtaining a single-walled carbon nanotubes feedstock, i.e. ex situ, from a supply unit or by in situ generation with respect to the composite. Furthermore, in step 67, at least one array of single-walled carbon nanotubes is defined with respect to a matrix of the composite. In step 68, a structure is formed including at least one array. In step 69 the structure is installed with the host device.

FIG. 10 shows an exemplary embodiment of a device 120 for the creation of an antiballistic composite 130. In FIG. 10, at least one catalyst 134 is set within a composite matrix 132. Moreover, in the exemplary embodiment of FIG. 10, the composite 130 is created within a form 131 so as to produce a predetermined structure.

The device 120 includes a generating element 123. In operation the generating element 123 arranges a multiplicity of single-walled carbon nanotubes 133 so as to define at least one array. Illustratively, for one exemplary embodiment, the generation element includes a lasing energy applicator for the arrangement of single-walled carbon nanotubes within the composite matrix 132. In operation, the lasing energy applicator 124 directs energy for the creation of at least one array so as to define the antiballistic composite 130.

Figure 11:
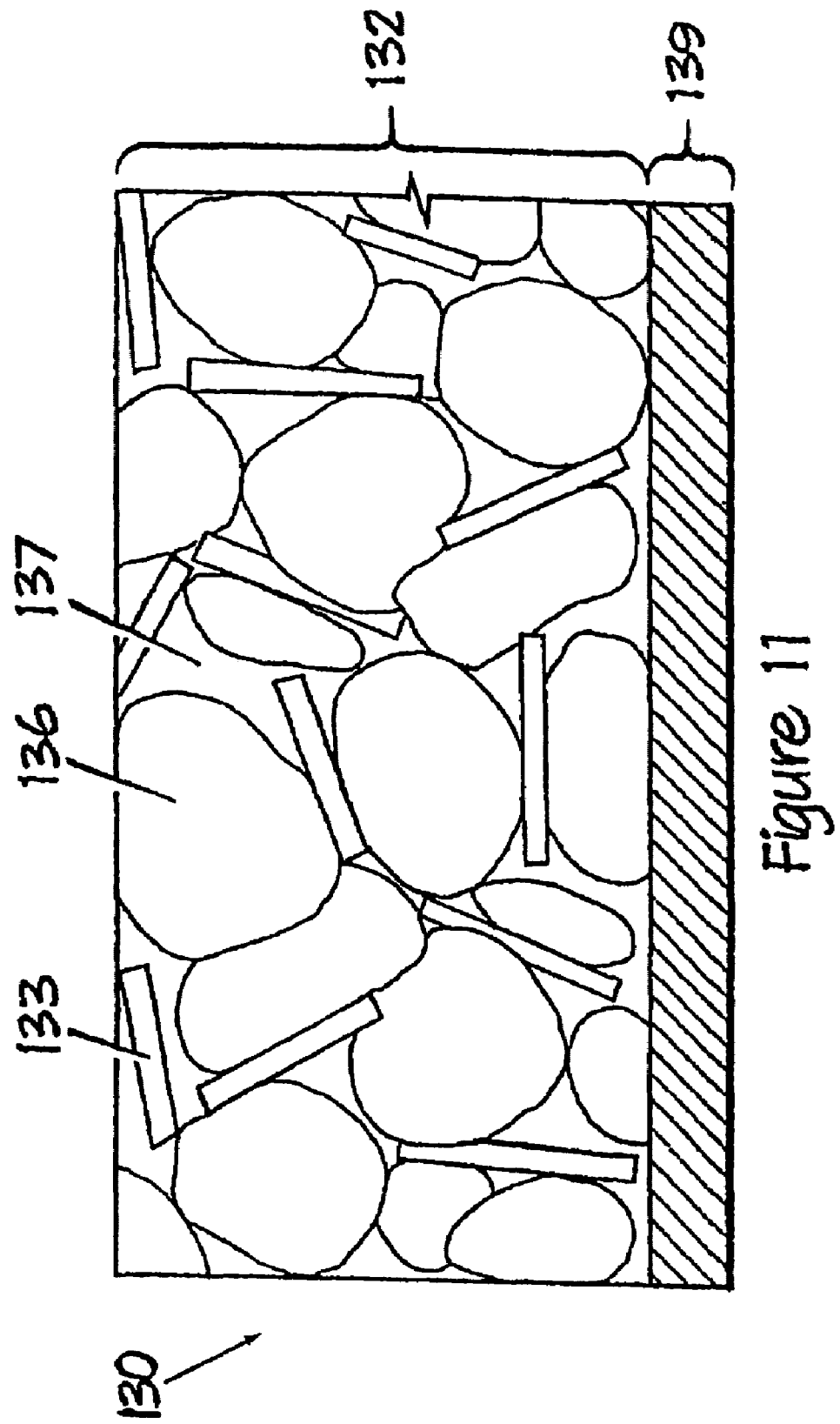
FIG. 11 is a cross-sectional view of the composite of FIG. 10 taken along line 11—11.

FIG. 11 is a cross-sectional view of the antiballistic composite 130 of FIG. 10 taken along line 11—11 thereof. For the exemplary embodiment shown in FIG. 11, the antiballistic composite 130 comprises a composite laminate. In other exemplary embodiments, however, the composite 130 excludes the substrate 139 so that the matrix 132 and array define a structure unit for incorporation with a host.

According to the laminate embodiment, the composite 130 includes a composite matrix 132 disposed on a substrate 139. The composite matrix 132 includes a multiplicity of particulate units 136 such as metallic and ceramic molecules for example. The composite matrix 132 includes a multiplicity of interstices 137 formed at the juncture of a plurality of particulate units 136. The multiplicity of interstices 137 thus receive a multiplicity of single-walled carbon nanotubes 133. For the antiballistic composite 130 of FIG. 11, the array is defined by the multiplicity of single-walled carbon nanotubes disbursed within the interstices 137. Thus, the random spatial alignment of single-walled carbon nanotubes 133 within the matrix 132 enables the composite 130 to sustain a projectile impact from a wide range of angular and/or spatial directions.

Figure 12:
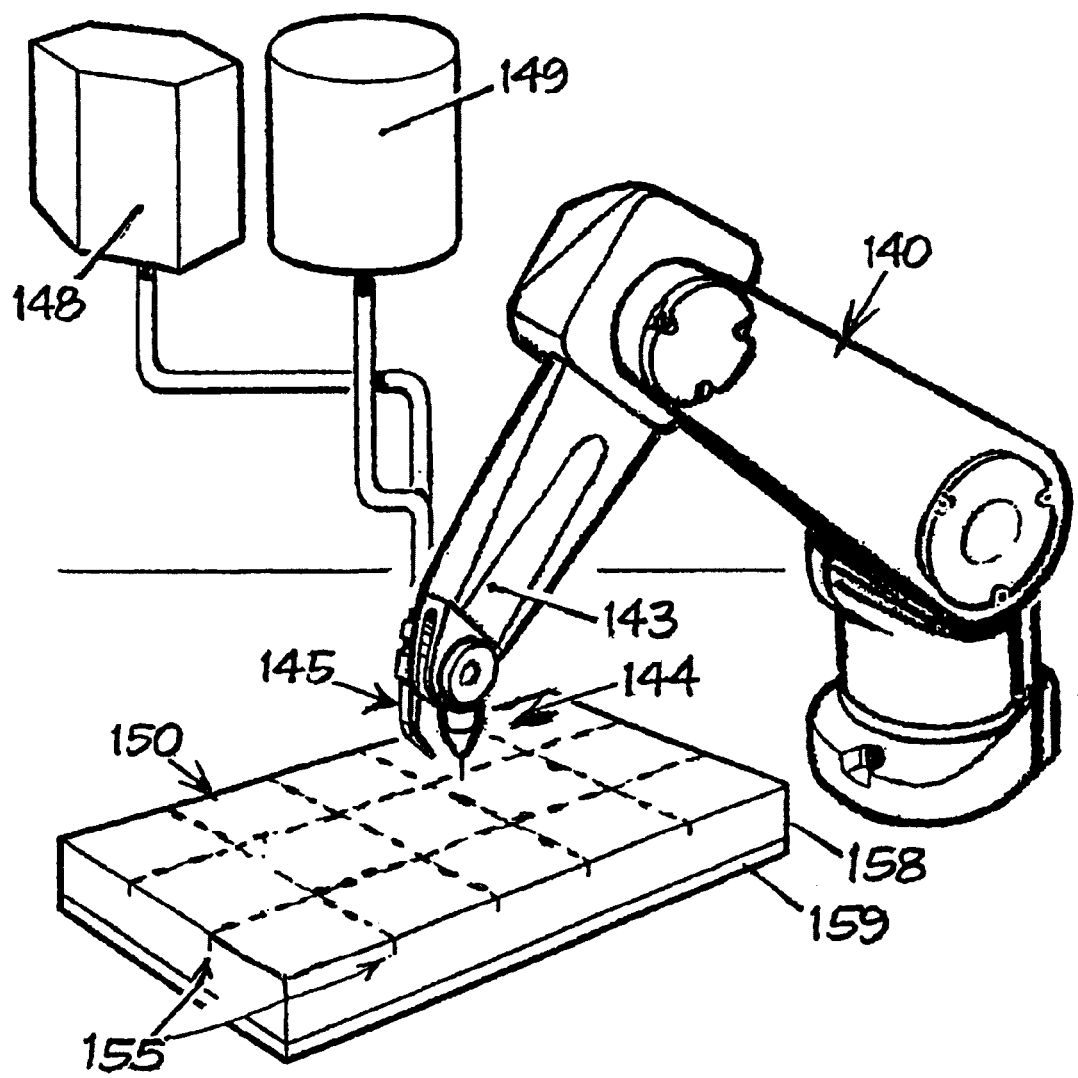
FIG. 12 is a schematic diagram detailing some aspects of arranging single-walled carbon nanotubes with respect to a composite of FIG. 12.

For the exemplary embodiment in FIG. 12, a device 140 is provided for the generation of an antiballistic composite 150. In the embodiment of FIG. 12, a multiplicity of single-walled carbon nanotubes are produced ex situ from that of the composite 150. Specifically, a single-walled carbon nanotube feedstock, produced ex situ, is supplied to the device 140 from a feedstock source 149.

The device 140 includes a generating element 143. The generating element includes a supply unit 145 coupled to the feedstock source 149 for providing single-walled carbon nanotubes to the composite 150 via the single-walled carbon nanotube feedstock. In one exemplary embodiment, for example the generating element 143 includes a lasing energy applicator 144 for the formation of an at least one array of single-walled carbon nanotubes within composite 150.

It should also be said that a control system 148 is coupled to the device 140. The control system 148 regulates the supply of single-walled carbon nanotube feedstock from the feedstock source 149 with respect to formation of the composite 150. The control system 148 further provides for the arrangement of each array of single-walled carbon nanotubes within the composite 150 as executed by the processing device 140.

The antiballistic composite 150 of FIG. 12 includes a composite 158 disposed on a substrate. Those of ordinary skill in the art will readily recognize that other embodiments the composite 150 may exclude a substrate so as to comprise a structure for incorporation with a host.

For the embodiment of FIG. 12, the composite 150 includes a plurality of arrays that comprise a net, web, and/or mesh-like shape following a grid-like axis arrangement 155.

Figure 13:
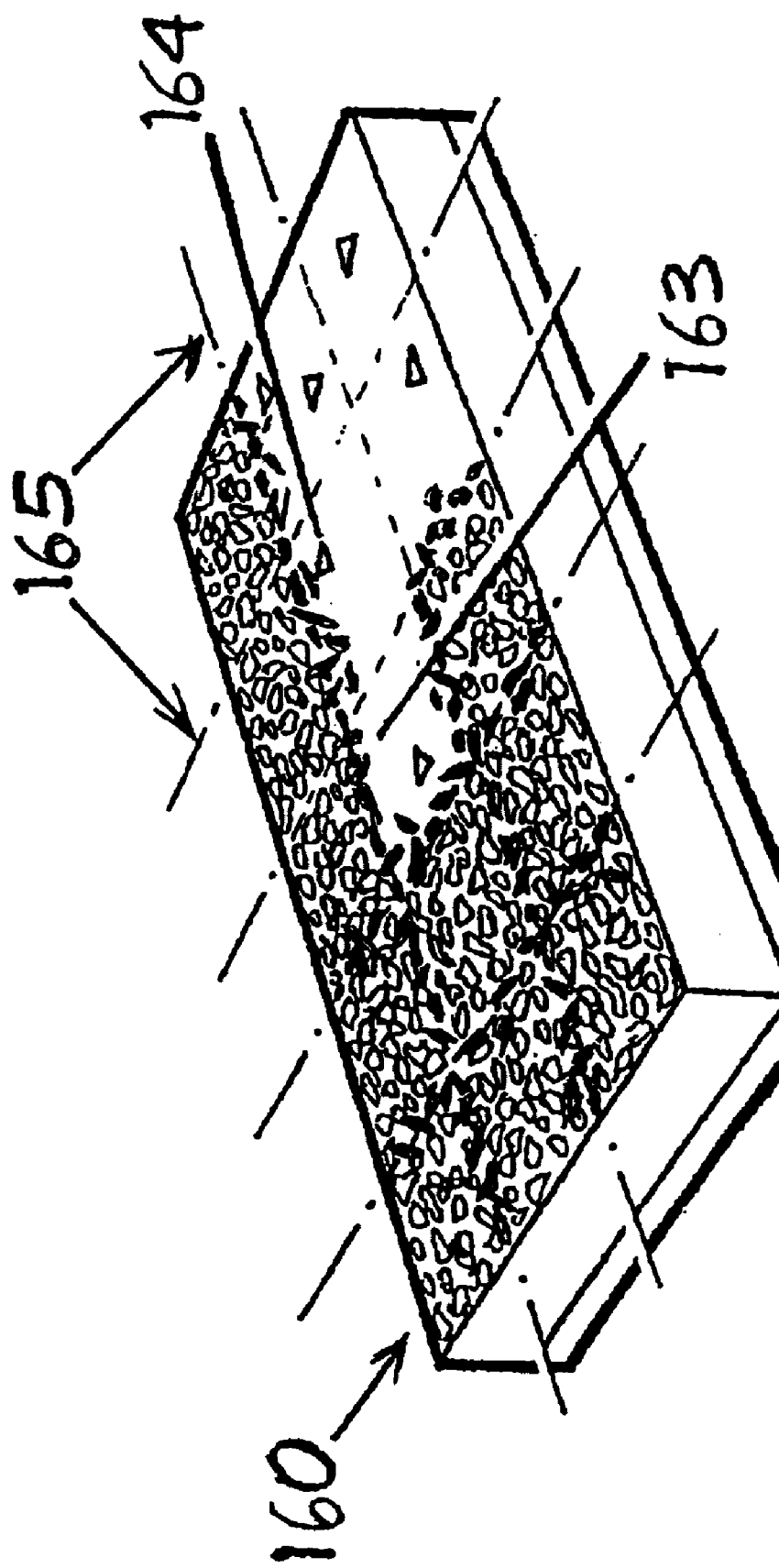
FIG. 13 is a schematic diagram detailing some aspects of the arrangement of single-walled carbon nanotubes with respect to the composite of FIG. 12.

For the embodiment of FIG. 13, an antiballistic composite 160 comprises an array of single-walled carbon nanotubes 163 introduced in situ with respect to the composite 160. Accordingly, the composite 160 includes a plurality of catalysts 164. As shown in FIG. 13, at least one array is arranged along a grid-like axis arrangement 165 so as to form a substantially mesh-like shape.

Figure 14:
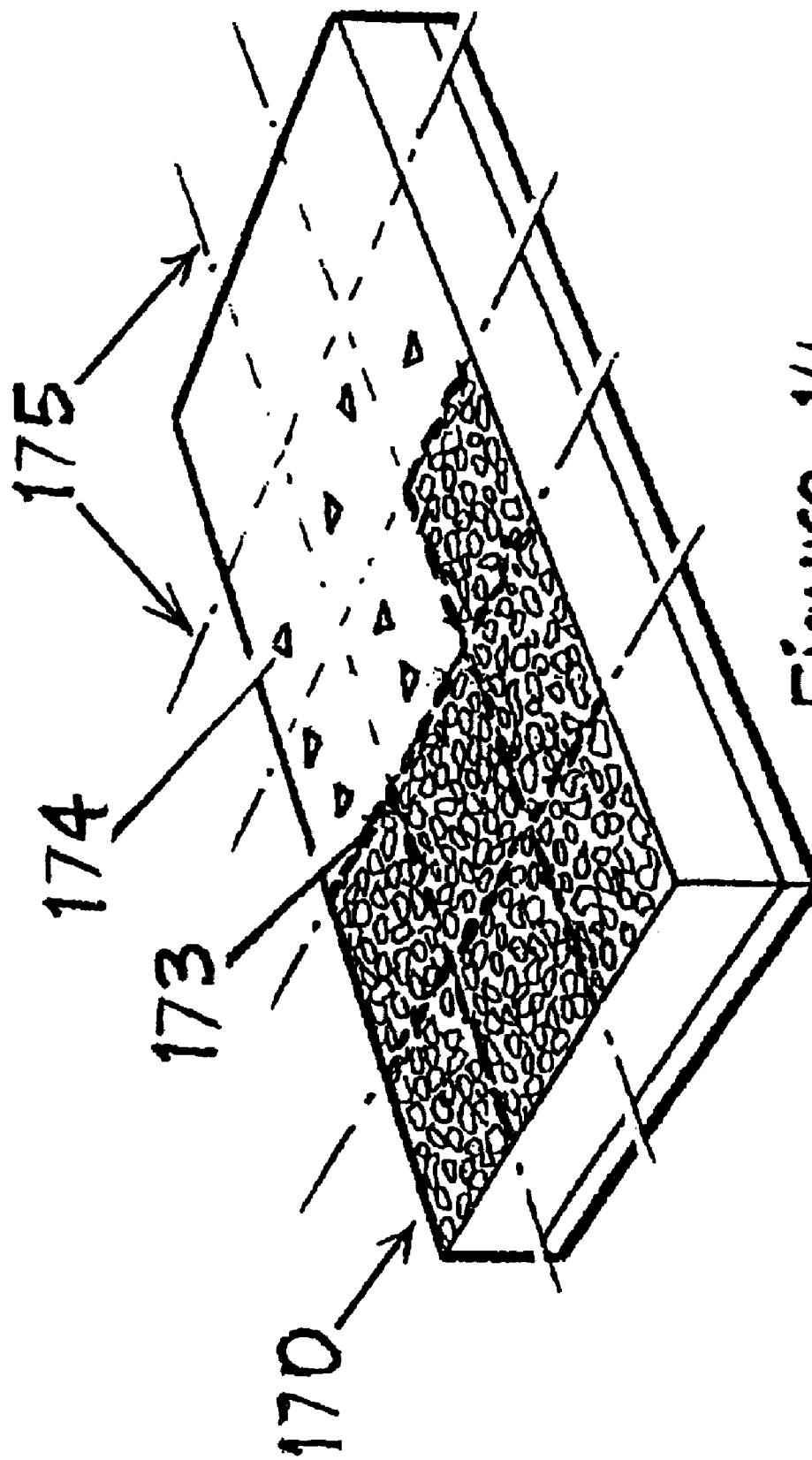
FIG. 14 is a schematic diagram detailing some aspects of the arrangement of single-walled carbon nanotubes with respect to the composite of FIG. 12.

For the embodiment of FIG. 14, an antiballistic composite 170 comprises an array of single-walled carbon nanotubes 173 introduced in situ with respect to the composite 170. Accordingly, the composite 170 includes a plurality of catalysts 174. As shown in FIG. 14, at least one array is arranged along a grid-like axis arrangement 175 so as to form a mesh-like shape.

In one exemplary embodiment, FIG. 15 illustrates a host 200 for receiving composite elements 210, 220 that each includes at least one array of single-walled carbon nanotubes. Illustratively, the host 200 comprises an aerospace vehicle. The composite component 210 comprises a laminate or structure unit for incorporation with the host 200. Similarly, the composite component 220 includes a laminate or structure unit for installation with the host 200. Moreover, the composite element 220 further includes at least one array 222 configured in a mesh-like formation.

As shown in an exemplary embodiment of FIG. 16, a composite element 310 is incorporated with a host 300. Illustratively, the host comprises a stock, ground vehicle. In particular, the host comprises a commercially available pick-up truck. Because of the lightweight, high ballistic protection provided by composites of single-walled carbon nanotubes, a wider range of devices or personnel may assume greater ballistic protection from projectiles.

With reference to FIG. 16, the composite element 310 comprises a laminate or a structure unit for incorporation with the host 300. Moreover as shown, the composite 310 comprises a plurality of single-walled carbon nanotube arrays. Accordingly, the composite element 310 includes a mesh-like array 314 that includes a multiplicity of single-walled carbon nanotubes 315 arranged in a net-like manner. In addition, the composite element 310 includes an array of single-walled carbon nanotubes 312 arranged within the interstices of a matrix.

Figure 17:
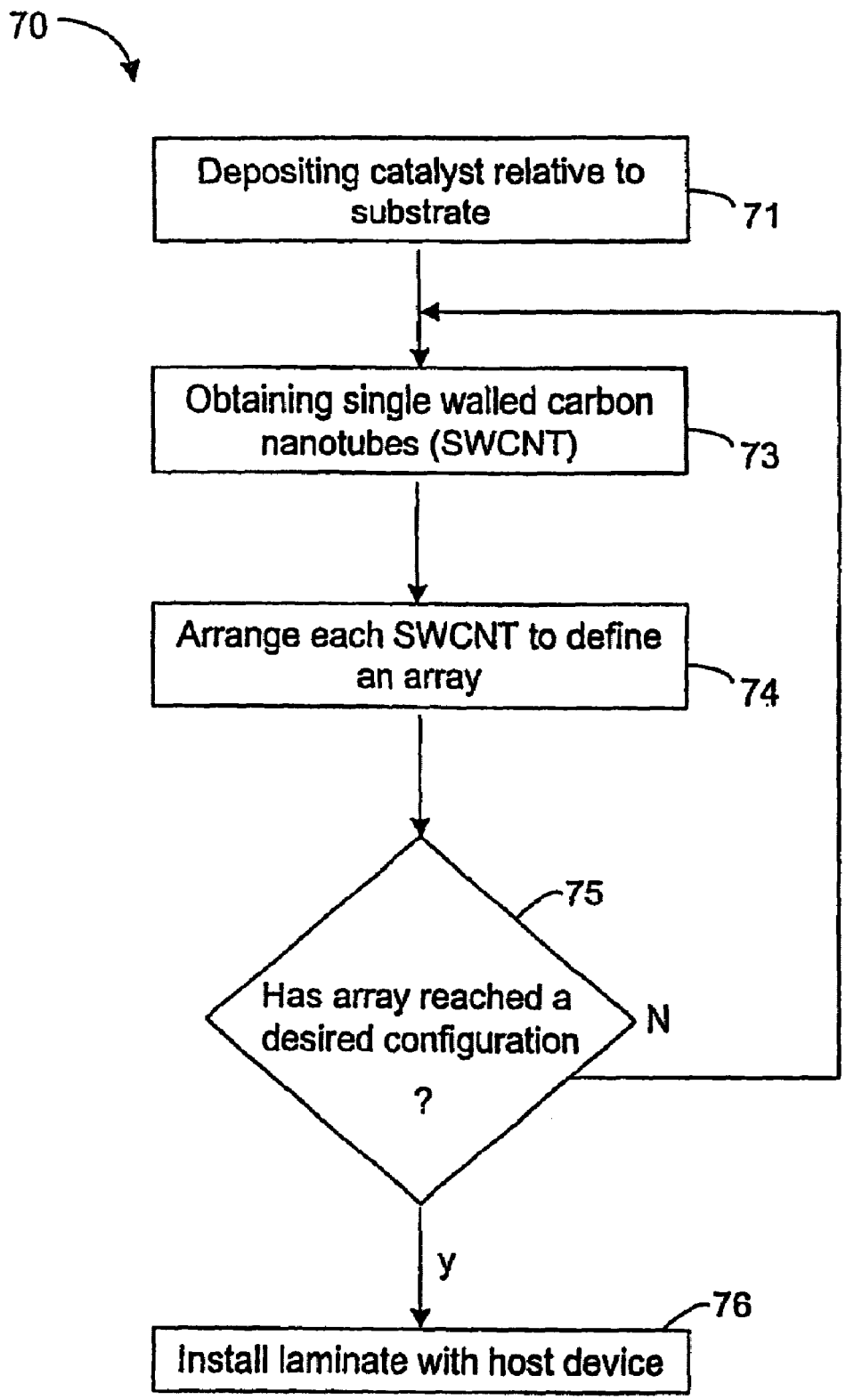
FIG. 17 is a flow diagram of another method for protection against an impacting ballistic element.

For the embodiment of FIG. 17, a method 70 for protection against an impacting ballistic element and for providing ease of mobility is shown. Accordingly, the method will continue to generate an array until the array has reached an optimal configuration for engagement with an impacting ballistic element. The method 70 generates the array so as to ultimately create a laminate for incorporation with a host.

In step 71, catalysts are deposited relative to the substrate. A multiplicity of single-walled carbon nanotubes are obtained in step 73. In step 74, each single-walled carbon nanotube is arranged to define an array.

For step 75 of FIG. 17, the method 70 includes a program written in a computer readable code and, thus, determines whether the array has reached a desired configuration. If the desired configuration is not reached, the method 70 will move from step 75 to step 73 to continue creation of the array. Alternatively, if the array has reached a desired configuration, the method 70 will advance from step 75 to step 76. In step 76 the resulting laminate including the newly formed array is installed with a host device.

Figure 18:
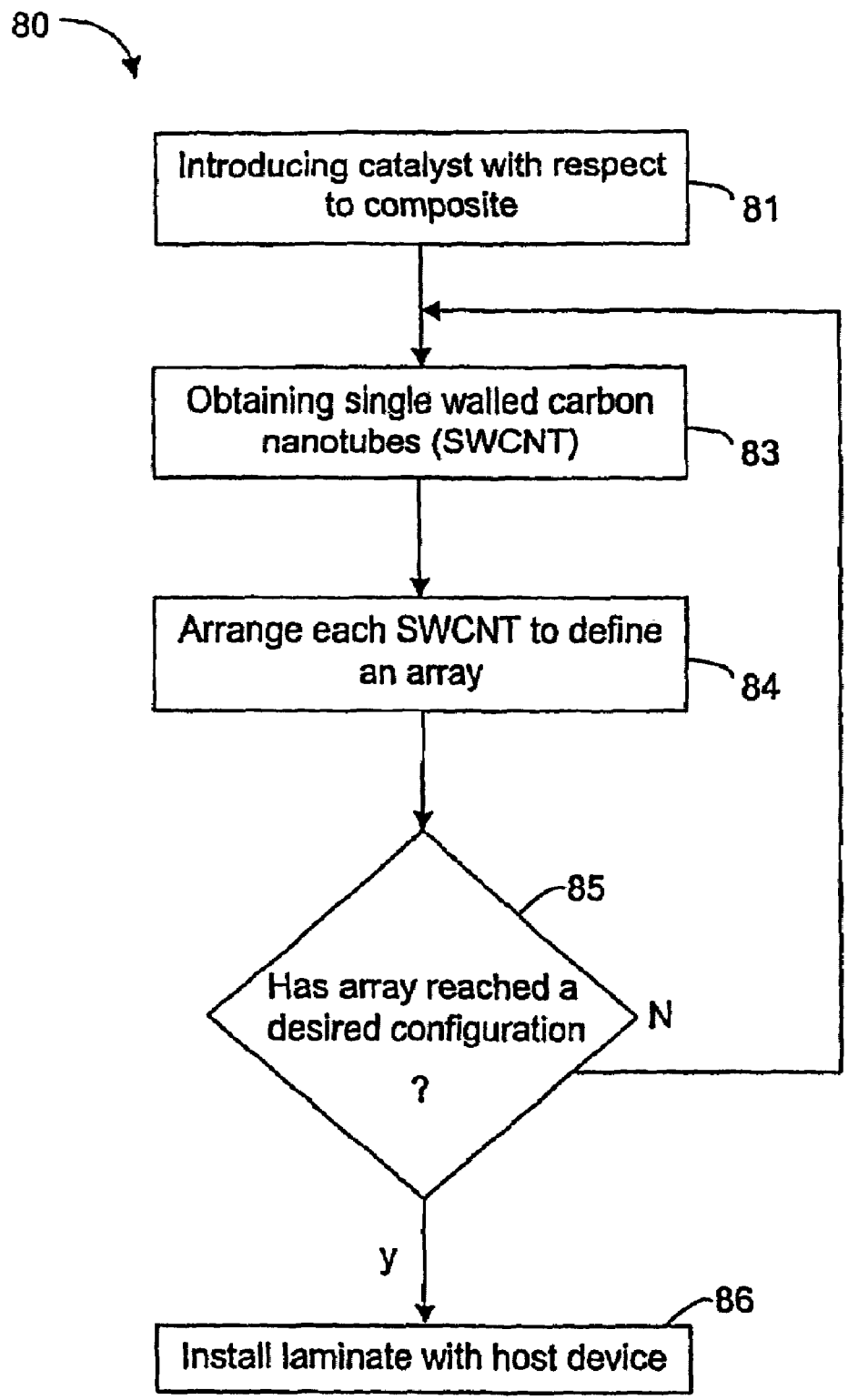
FIG. 18 is a flow diagram of another method for protection against an impacting ballistic element.

For the embodiment of FIG. 18, a method 80 for protection against an impacting ballistic element and for providing ease of mobility is shown. Whereas the method 75 of FIG. 17 includes forming at least one desired array with respect to a laminate, the method 80 of FIG. 18 features generating at least one array in a similar manner to form a structure unit for incorporation with a host.

As such, in step 81 at least one catalyst is introduced with respect to a composite. In step 83, a multiplicity of single-walled carbon nanotubes are obtained. For example, single-walled carbon nanotubes are obtained by either in situ or ex situ means for production. By arranging each single-walled carbon nanotube an array is formed in step 84.

In step 85, the method 80 includes a program written in a computer readable code and with supporting sensory means and, thus, determines whether the array has reached a desired configuration for forming a structure. If the desired configuration has not yet been obtained, the method 80 will move from step 85 to step 83 to continue forming the desired array. On the other hand, if the array has reached the desired configuration, the method 80 will advance from step 85 to step 86. In step 86, the resulting structure unit including the array is installed with respect to the host.

Figure 19:
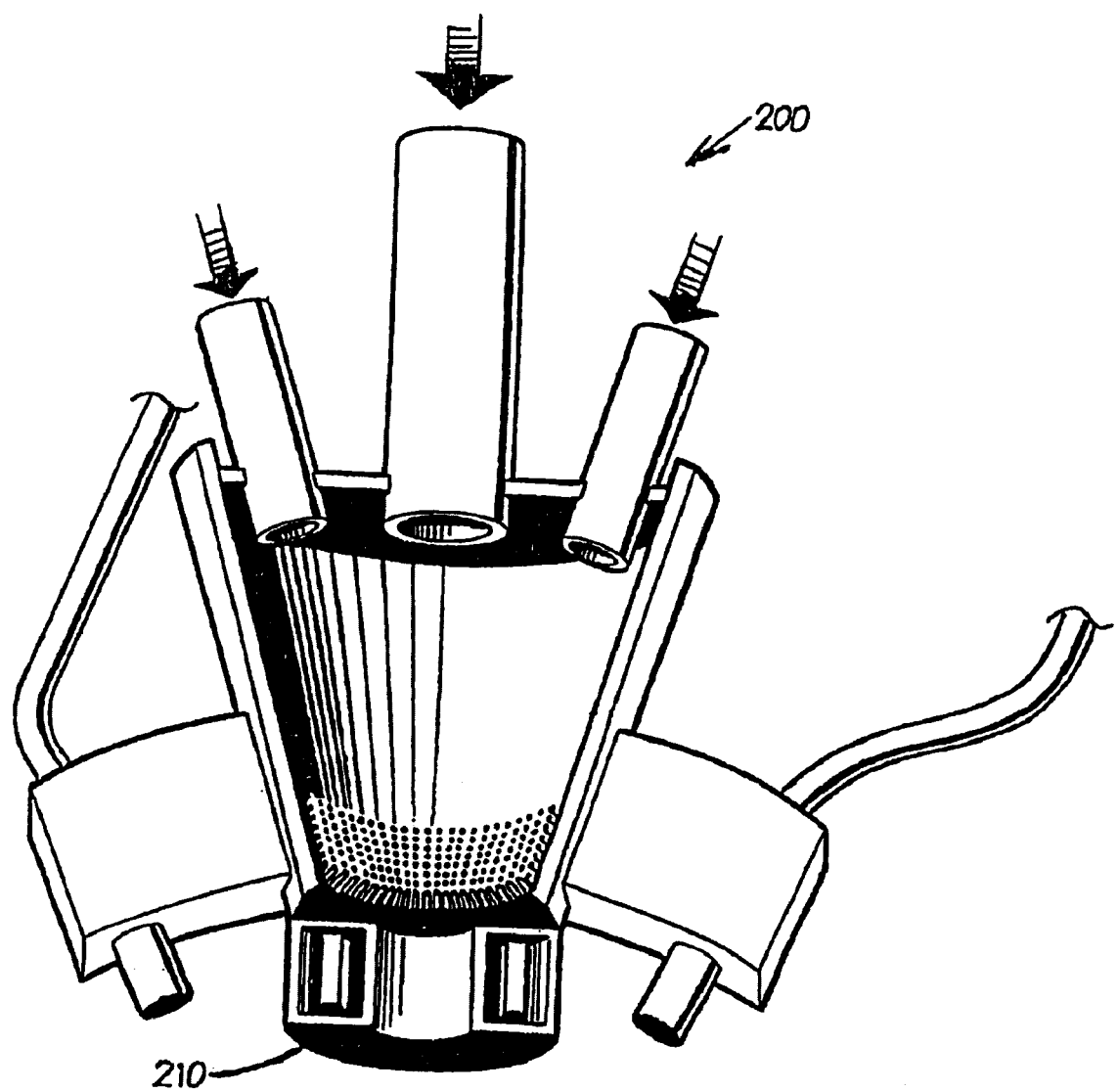
FIG. 19 is a schematic diagram of a device for arranging single-walled carbon nanotubes.

FIG. 19 shows a supply unit 200. In operation of one exemplary embodiment of the present invention, the supply unit 200 discharges single-walled carbon nanotube feedstock from an outlet 210. As such, the supply unit 200 facilitates with the formation of at least one array for inclusion with a composite and for engagement with an impacting ballistic projectile.

Although the present invention has been described in terms of a foregoing embodiment, such description has been for exemplary purposes only and, as will be apparent to those of ordinary skill in the art, many alterations, equivalents, and variations will fall within the scope of the present invention. That scope, accordingly, is not to be limited in any respect by the foregoing description; rather the scope is also defined by the claims that follow.

What is claimed is:

1. A structure arrangement for the protection of a host against an impacting ballistic element, the structure arrangement comprising:
   a substrate;
     the substrate coupled to the host; and
   a composite;
     the composite disposed on the substrate;
     the composite comprising
       a matrix; and
       a multiplicity of single walled carbon nanotubes; and
     the single walled carbon nanotubes arranged with respect to the matrix so as to define a substantially entangled array operable to engage the ballistic element.

2. The structure arrangement according to claim 1 wherein the array is defined by the multiplicity of single walled carbon nanotubes positioned between the interstices of the matrix.

3. The structure arrangement according to claim 1 wherein the array is defined by the multiplicity of single walled carbon nanotubes arranged along a plane with respect to the matrix.

4. The structure arrangement according to claim 1 wherein the array is defined by the multiplicity of single walled carbon nanotubes arranged along a plurality of planes with respect to the matrix.

5. The structure arrangement according to claim 1 wherein the matrix comprises at least one transparent material.

6. The structure arrangement according to claim 1 wherein the matrix comprises at least one translucent material.

7. A structure arrangement for the protection of a host against an impacting ballistic element, the structure arrangement comprising:
   a composite;
     the composite comprising
       a matrix; and
       a multiplicity of single walled carbon nanotubes, wherein the multiplicity of single walled carbon nanotubes are substantially entangled and isotropically oriented;
     the single walled carbon nanotubes arranged with respect to the matrix so as to define an array for engagement with the ballistic element; and
     the composite defining a structure unit for incorporation with the host.

8. The structure arrangement according to claim 7 wherein the array is defined by the multiplicity of single walled carbon nanotubes positioned between the interstices of the matrix.

9. The structure arrangement according to claim 7 wherein the array is defined by the multiplicity of single walled carbon nanotubes arranged along a plane with respect to the matrix.

10. The structure arrangement according to claim 7 wherein the array is defined by the multiplicity of single walled carbon nanotubes arranged along a plurality of planes with respect to the matrix.

11. The structure arrangement according to claim 7 wherein the matrix comprises at least one transparent material.

12. The structure arrangement according to claim 7 wherein the matrix comprises at least one translucent material.

13. A structure arrangement for providing ease of mobility to a host and for the protection of the host against an impacting ballistic element, the structure arrangement comprising:
    a substrate;
      the substrate coupled to the host; and
    a composite;
      the composite disposed on the substrate;
      the composite comprising
        a matrix; and
        a multiplicity of single walled carbon nanotubes, wherein the multiplicity of single walled carbon nanotubes are isotropically oriented and substantially entangled; and
      the single walled carbon nanotubes arranged with respect to the matrix so as to define an array.

14. A structure arrangement for providing ease of mobility to a host and for the protection of the host against an impacting ballistic element, the structure arrangement comprising:
    a composite;
      the composite comprising
        a matrix; and
        a multiplicity of single walled carbon nanotubes;
      the single walled carbon nanotubes isotropically oriented and arranged with respect to the matrix so as to define an array; and
      the composite defining a structure unit for incorporation with the host.

15. A system for protection against an impacting ballistic element, the system comprising:

a host; and
a structure arrangement comprising
    a substrate;
        the substrate coupled to the host;
    a composite;
        the composite disposed on the substrate;
        the composite comprising
            a matrix; and
            a multiplicity of single walled carbon nanotubes;
    the single walled carbon nanotubes arranged with respect to the matrix so as to define a net for engagement with the ballistic element.

16. A system for protection against an impacting ballistic element, the system comprising:
a host; and
a structure arrangement comprising
    a composite;
        the composite comprising
            a matrix; and
            a multiplicity of single walled carbon nanotubes;
    the single walled carbon nanotubes isotropically oriented and arranged with respect to the matrix so as to define an array for engagement with the ballistic element; and
    the composite defining a structure unit for incorporation with the host.

17. A composite material operable to engage a ballistic element, comprising:
a graphite epoxy matrix; and
a mesh operable to engage the ballistic element and distribute the ballistic element's kinetic energy wherein the mesh comprises a plurality of isotropically oriented single walled carbon nanotubes, wherein
the single walled carbon nanotubes arranged with respect to the matrix so as to define the mesh.

18. The composite material of claim 17, wherein the composite is disposed on a substrate, wherein the composite defining a structural unit for incorporation within a host operable to supply maneuverability to the host.

19. A structure arrangement for the protection of a host against an impacting ballistic element, the structure arrangement comprising:
a substrate;
    the substrate coupled to the host; and
a composite;
    the composite disposed on the substrate;
    the composite comprising
        a binding agent; and
        a multiplicity of substantially entangled single walled carbon nanotubes; and
    the single walled carbon nanotubes entangled with one another and the binding agent so as to define an isotropic array for engagement with the ballistic element.

20. A structure arrangement for the protection of a host against an impacting ballistic element, the structure arrangement comprising:
a composite;
    the composite comprising
        a binding agent; and
        a multiplicity of single walled carbon nanotubes;
    the single walled carbon nanotubes entangled with one another and the binding agent so as to define an isotropic array for engagement with the ballistic element; and
    the composite defining a structure unit for incorporation with the host.

* * * * *